US007905696B2

(12) United States Patent
Chiu

(10) Patent No.: US 7,905,696 B2
(45) Date of Patent: Mar. 15, 2011

(54) FASTENER FOR JOINING METAL PLATE MEMBERS

(75) Inventor: Ming-Chung Chiu, Sijhih (TW)

(73) Assignee: Hanwit Precision Industries Ltd., Sijhih, Taipei County (TW)

( * ) Notice: Subject to any disclaimer, the term of this patent is extended or adjusted under 35 U.S.C. 154(b) by 141 days.

(21) Appl. No.: 12/402,510

(22) Filed: Mar. 12, 2009

(65) Prior Publication Data

US 2010/0232908 A1 Sep. 16, 2010

(51) Int. Cl.
*F16B 21/18* (2006.01)

(52) U.S. Cl. ........................................ 411/353; 411/107

(58) Field of Classification Search .................. 411/554, 411/352, 353, 347, 360, 999, 171, 339
See application file for complete search history.

(56) References Cited

U.S. PATENT DOCUMENTS 3,343,581 A * 9/1967 Martin et al. ................ 411/349
4,387,497 A * 6/1983 Gulistan ........................ 29/511
4,723,881 A * 2/1988 Duran .......................... 411/353
5,871,319 A * 2/1999 Schneider ..................... 411/107
6,079,923 A * 6/2000 Ross et al. .................... 411/353
6,394,724 B1 * 5/2002 Kelly et al. .................. 411/353
6,682,282 B2 * 1/2004 Allen ........................... 411/353
6,814,530 B2 * 11/2004 Franco et al. ................ 411/353
7,213,321 B2 * 5/2007 Franco et al. .................. 29/453
2004/0210962 A1 * 10/2004 Mackenzie et al. ........... 800/278
2005/0047889 A1 * 3/2005 Lee .............................. 411/352

* cited by examiner

*Primary Examiner* — Gary Estremsky
(74) *Attorney, Agent, or Firm* — Muncy, Geissler, Olds & Lowe, PLLC

(57) ABSTRACT

A fastener includes a socket for fastening to a mounting through hole of a first metal plate member, a screw member inserted through the socket for threading into a screw hole of a second metal plate member to joint the first and second metal plate members together, a barrel molded on the head of the screw member and axially movably coupled to the socket for enabling the screw member to be moved axially relative to the socket and rotated with the barrel relative to the socket and having interference devices protruded from the inside wall for friction engagement with the socket, and a spring member sleeved onto the shank of the screw member and stopped between the head of the screw member and an inside annular flange of the socket.

10 Claims, 8 Drawing Sheets

FASTENER FOR JOINING METAL PLATE MEMBERS

BACKGROUND OF THE INVENTION

1. Field of the Invention

The present invention relates to a fastening device and more particularly, to a fastener for joining metal plate members that is easy and inexpensive to manufacture.

2. Description of the Related Art

When fastening plate members together, a positioning screw formed of a knob, a ring and a screw nail is usually used. During installation, the screw nail and the ring are secured to the first plate member, and then the knob is rotated to drive the screw nail into the second plate member, and then a hand tool is used to fasten tight the screw nail, affixing the first and second plate members together. This plate member joining method can be used in a machine tool to join plate members together.

The power drive and speed-adjustment unit of a machine tool are generally provided inside the housing. To facilitate repair of a machine tool or adjustment of the output speed of a machine tool, a detachable plate member is usually provided at the housing of the power drive or speed-adjustment unit. Screw bolts are commonly used to fasten the movable plate member to the housing. When unfastening screw bolts to dismount a movable plate member from the housing, the associating lock nuts may fall from the screw bolts.

There is known a fastener comprised of a cap, a screw, a spring member, a mounting socket and a locknut for joining two metal plate members together. The fastener is to be picked up for installation manually. During installation, hold the cap with the hand to move the fastener into alignment with the mounting through hole on the first metal plate member, and then insert the front (bottom) end of the mounting socket into the mounting through hole to have a mounting flange of the mounting socket be bonded to the top wall of the first plat member with a solder paste. Picking up the fastener for installation manually wastes much time and labor. For automatic installation by a mounting system, a Teflon ring may be used with the fastener. The Teflon ring is inserted into the bottom hole of the mounting socket and forced into friction engagement with the periphery of the bottom end of the screw to lock the cap, the screw and the mounting socket, allowing the fastener to be picked up by a mounting system for quick installation. Immediately after bonding of the mounting socket to the first plate member, the cap and the screw must be rotated to force the Teflon ring away from the mounting socket and the first plate member so that the cap can be lowered relative to the mounting socket and the first plate member for enabling the screw to be driven into the second plate member.

SUMMARY OF THE INVENTION

The present invention has been accomplished under the circumstances in view. A fastener for joining metal plate members in accordance with the present invention comprises a metal socket for fastening to a mounting through hole of a first metal plate member, a metal screw member inserted through the socket for threading into a screw hole of a second metal plate member to secure the first and second metal plate members together, and a plastic barrel directly molded on the head of the screw member and axially movably coupled to the socket for rotating by a user to drive the screw member into the screw hole of the second metal plate member. The plastic barrel has interference means protruded from the inside wall for friction engagement with the socket. Further, the plastic barrel can be molded from heat-resistance and anti-corrosion plastics in any of a variety of shapes and colors. By means of directly molding the plastic barrel on the head of the metal screw member, the fabrication of the fastener is simplified, saving much labor and the cost.

Further, the screw member comprises a shank perpendicularly downwardly extended from the bottom side of the head thereof and terminating in a connection portion having an external thread for threading into the screw hole of the second metal plate member. Further, a spring member is sleeved onto the shank of the screw member and stopped between the head of the screw member and an inside annular flange of the socket. Further, a metal stop ring is forced onto the shank of the screw member into friction engagement with the inside wall of the socket for stoppage between the inside annular flange of the socket and the outer thread of the connection portion of the shank of the screw member to prevent escape of the screw member from the socket.

Further, the barrel comprises interface means protruded from the inside wall, and the socket comprises a tubular top coupling flange for friction engagement with the interference means of the barrel. The socket further comprises a tubular bottom coupling flange for fitting into the mounting through hole of the first metal plate member, and a bottom step for bonding to the top wall of the first metal plate member with a solder paste. Further, the screw member can be made having a tool groove on the top side of the head thereof for the positioning of a screwdriver for rotating the screw member into the screw hole of the second metal plate member.

When wishing to remove the first metal plate member from the second metal plate member, rotate the barrel in the reversed direction to disengage the screw member from the screw hole of the second metal plate member. After disengagement of the screw member from the screw hole of the second metal plate member, the first metal plate member can be directly removed from the second metal plate member.

DETAILED DESCRIPTION OF THE PREFERRED EMBODIMENT

Figure 1:
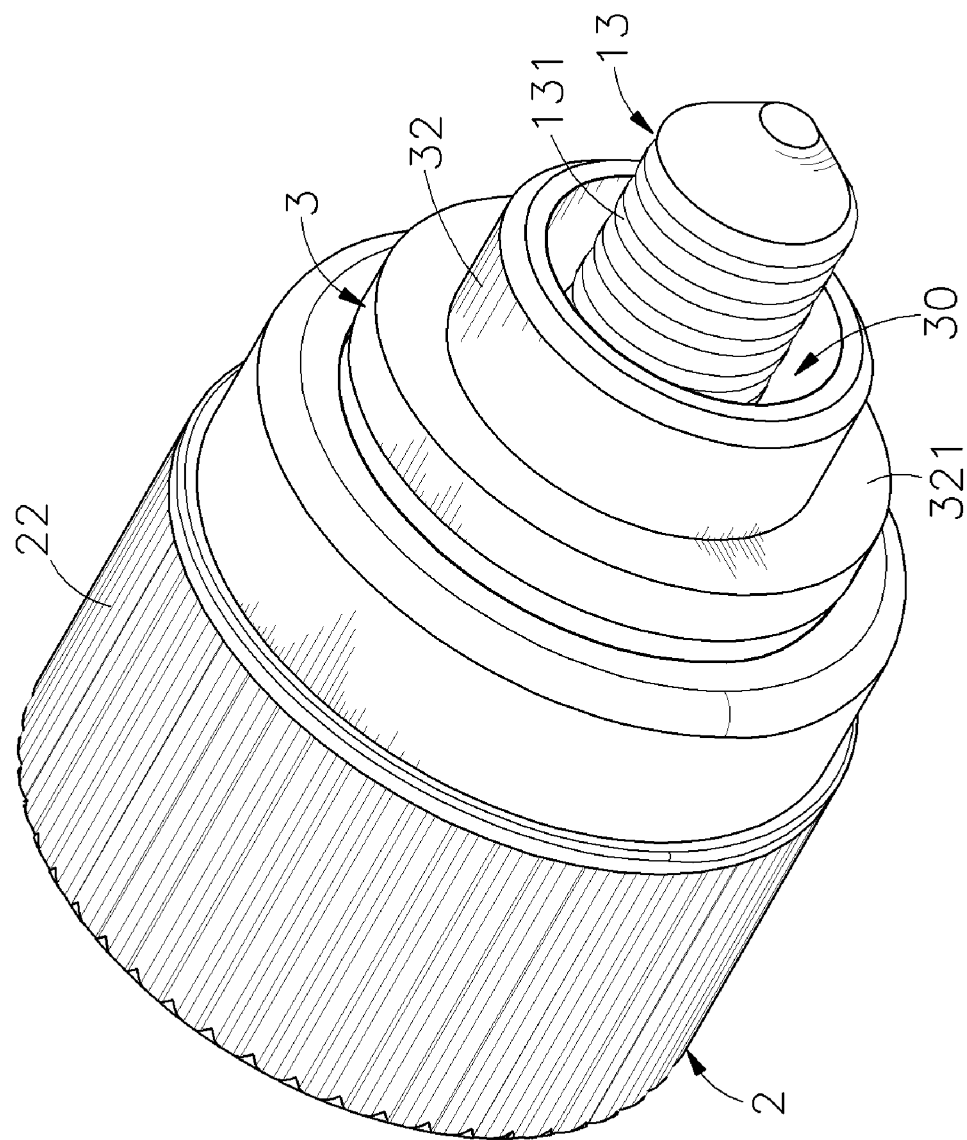
FIG. 1 is an elevational view of a fastener in accordance with the present invention.
Figure 2:
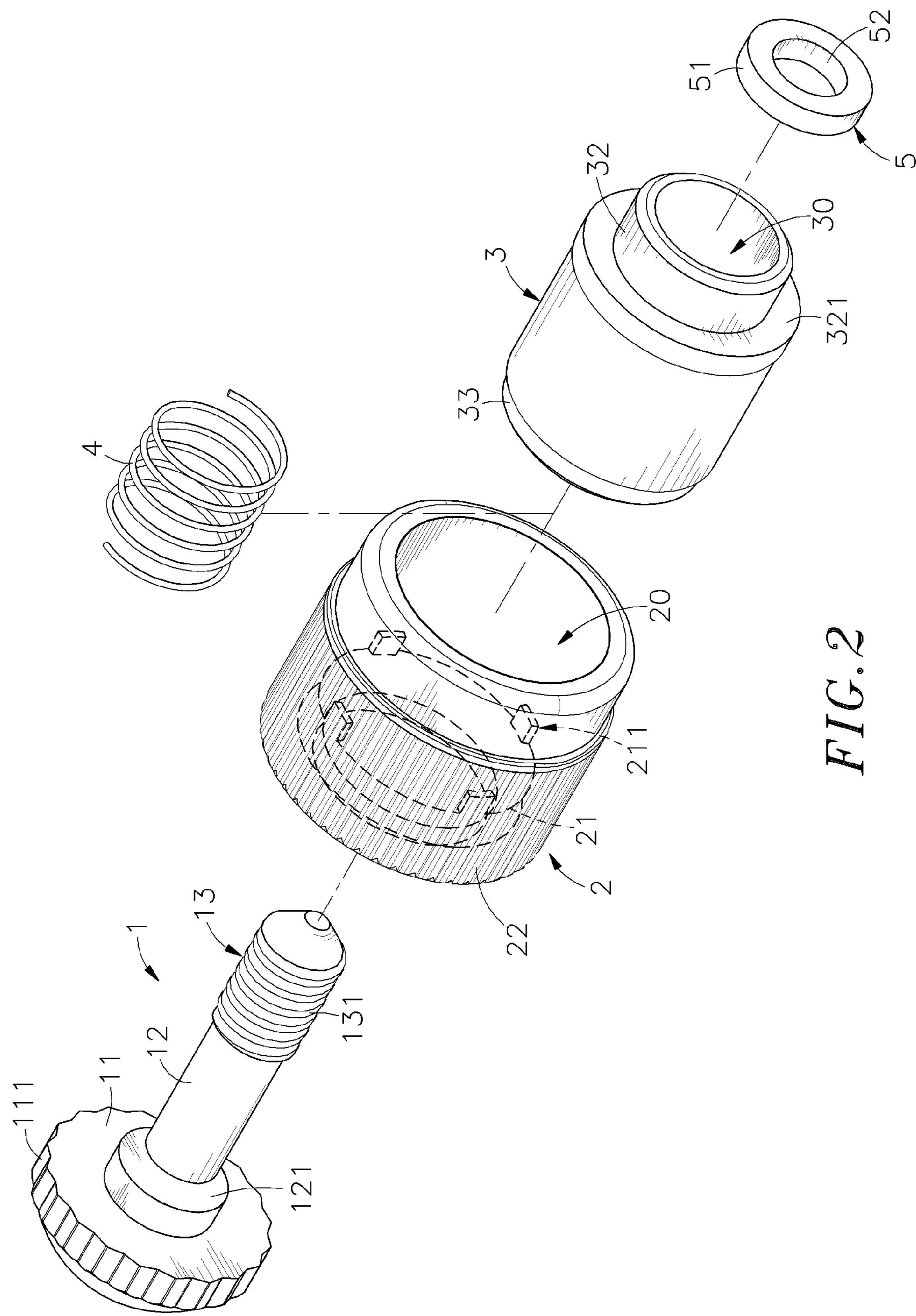
FIG. 2 is an exploded view of the fastener in accordance with the present invention.
Figure 3:
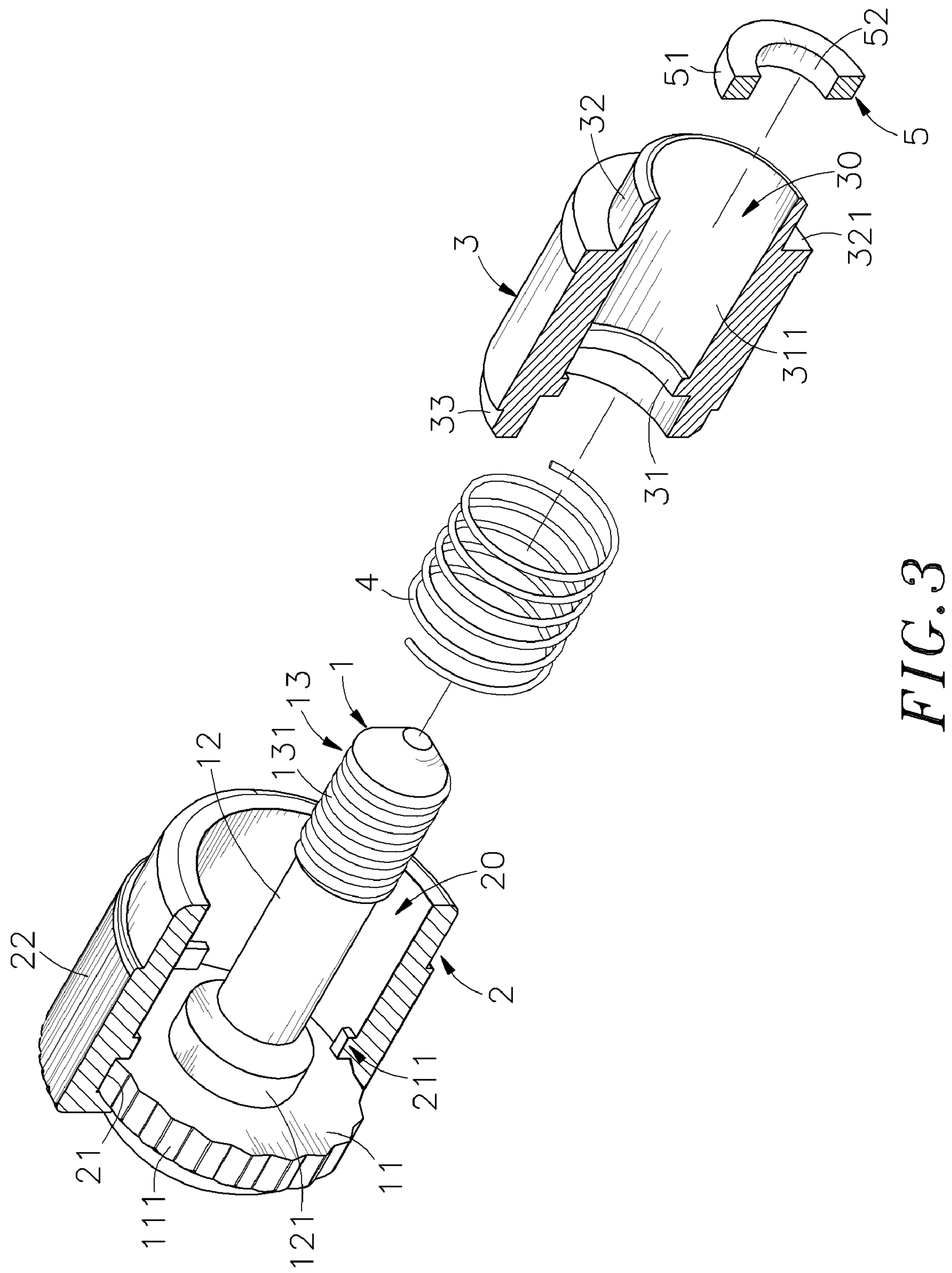
FIG. 3 is an exploded view in sectional elevation of the present invention, showing the barrel formed integral with the head of the screw member.

Referring to FIGS. 1~3, a fastener in accordance with the present invention includes a screw member 1, a barrel 2, a socket 3, a spring member 4, and a stop ring 5.

The screw member 1 has a head 11, an engagement portion 111 formed on the periphery of the head 11, a shank 12 perpendicularly extended from the center of the bottom wall of the head 11 and terminating in a connection portion 13, a shoulder 121 connected between the bottom wall of the head 11 and the shank 12, and a tool groove 112 located on the top wall of the head 11. According to this embodiment, the connection portion 13 has an outer thread 131 spirally extending around the periphery. Further, the tool groove 112 can be a Phillipes groove, keystone groove, asterisk groove or hex groove.

The barrel 2 is a hollow cylindrical member having an accommodation chamber 20 defined therein for accommodating the screw member 1, the socket 3 and the spring member 4, a retaining groove 21 extending around the inside wall near the top for engagement with the engagement portion 111 of the screw member 1 to prohibit rotation of the barrel 2 relative to the screw member 1, interference means 211 protruded from the inside wall at the bottom side of the retaining groove 21, and a grip 22 formed on the periphery for grasping by hand to rotate the barrel 2.

The socket 3 is a tubular member having a center opening 30 axially extending through the top and bottom sides for the passing of the shank 12 of the screw member 1, an inside annular flange 31 extending around the inside wall thereof, a tapered inside wall portion 311 surrounding the center opening 30 and gradually increasing in diameter from the inside annular flange 31 toward the bottom side of the socket 3, a tubular bottom mounting flange 32 axially outwardly extended from the bottom side in flush with the tapered inside wall portion 311, a bottom step 321 defined between the outside wall of the bottom mounting flange 32 and the bottom side of the socket 3, and a tubular top coupling flange 33 axially outwardly extended from the top side for friction engagement with the interference means 211 of the barrel 2.

The spring member 4 is sleeved onto the shoulder 121 of the screw member 1 and stopped between the head 11 of the screw member 1 and the top side of the inside annular flange 31 of the socket 3.

The stop ring 5 is a metal ring having an inner diameter 52 and an outer diameter 51. The stop ring 5 is sleeved onto the shank 12 of the screw member 1 inside the socket 3 and forced into friction engagement with the tapered inside wall portion 311 of the socket 3 and stopped between the bottom side of the inside annular flange 31 of the socket 3 and the connection portion 13 of the screw member 1 to prohibit escape of the screw member 1 from the socket 3.

The aforesaid screw member 1 is made of metal. The barrel 2 is directly molded on the head 11 of the screw member 1 with over-molding technology. After molding, the engagement portion 111 of the head 11 of the screw member 11 that can be formed of a series of barbs, teeth or protruding ribs is formed integral with the retaining groove 21 of the barrel 2 so that a user can drive the grip 21 to rotate the screw member 1 into the workpiece. Because the screw member 1 and the barrel 2 are integrally formed in one piece, the screw member 1 will never escape from the barrel 2. Further, the interference means 211 can be made comprising a plurality of raised portions, an annular flange or threads protruded from the inside wall of the barrel 2 for friction engagement with the top coupling flange 33 of the socket 3 to temporarily secure the socket 3 to the inside of the barrel 2 for enabling the bottom step 321 of the socket 3 to be covered with a solder paste and bonded to the border area of a mounting through hole 61 of a first metal plate member 6 with a reflow soldering process (see FIG. 5). Further, the barrel 2 can be molded from heat-resistance and anti-corrosion plastics in any of a variety of shapes and colors suitable for grasping with the hand. By means of directly molding the barrel 2 on the head 11 of the screw member 1, a secondary mounting process is eliminated, saving much the manufacturing time and cost. Further color indication facilitates installation recognition.

Figure 4:
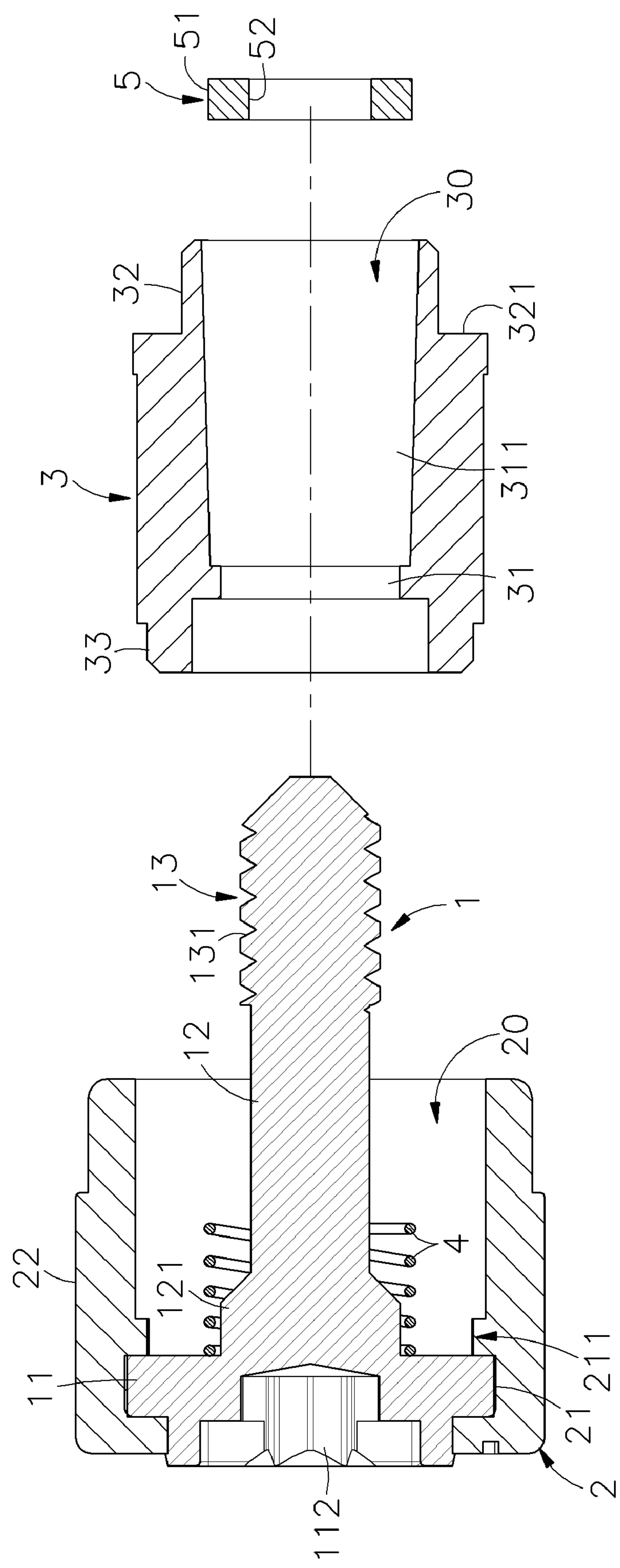
FIG. 4 is a sectional view of the present invention, showing the barrel formed integral with the head of the screw member and the spring member sleeved onto the shoulder of the screw member before installation of the socket and the stop ring.
Figure 5:
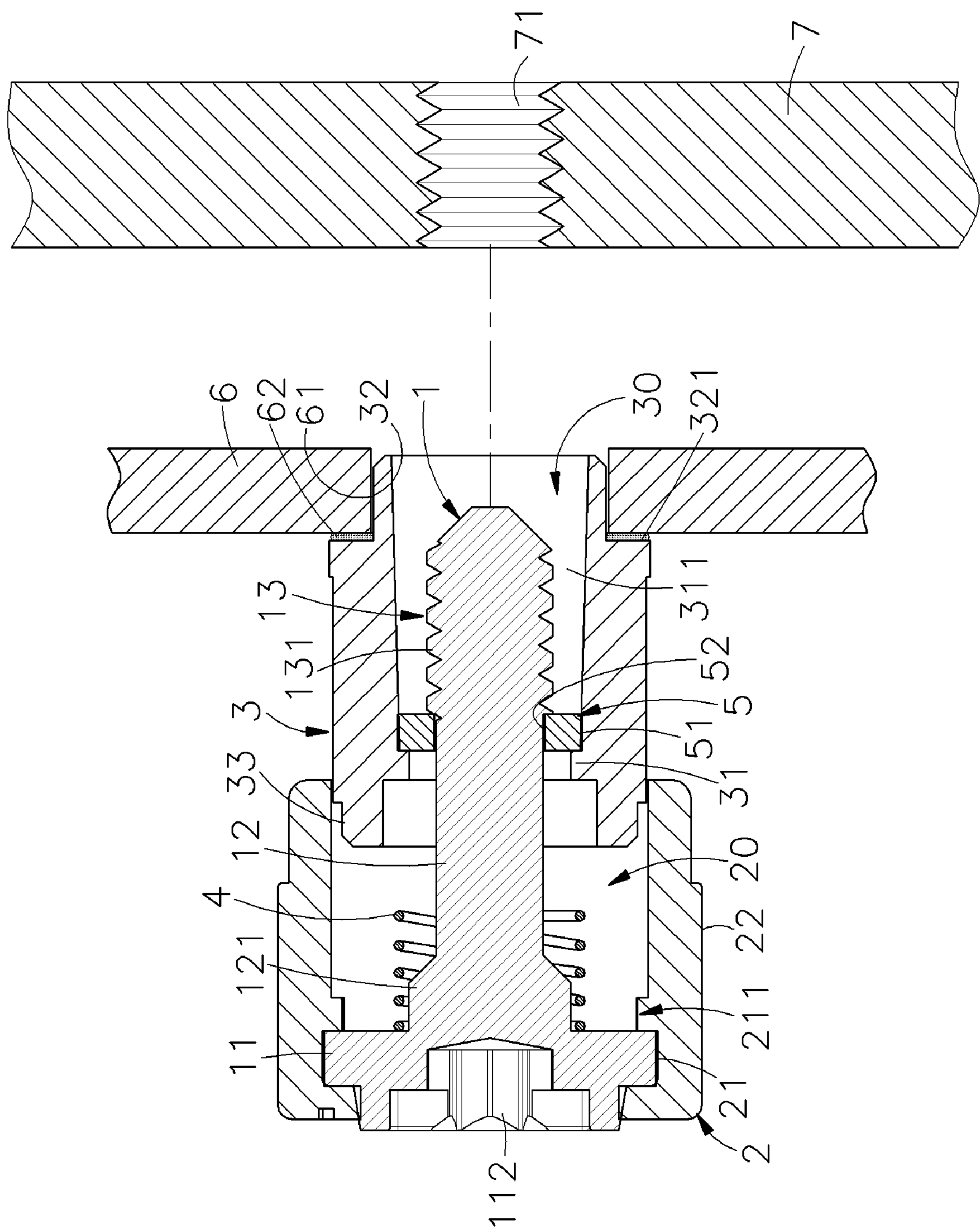
FIG. 5 is a schematic sectional view of the present invention, showing the socket of the fastener bonded to a first metal plate member.
Figure 6:
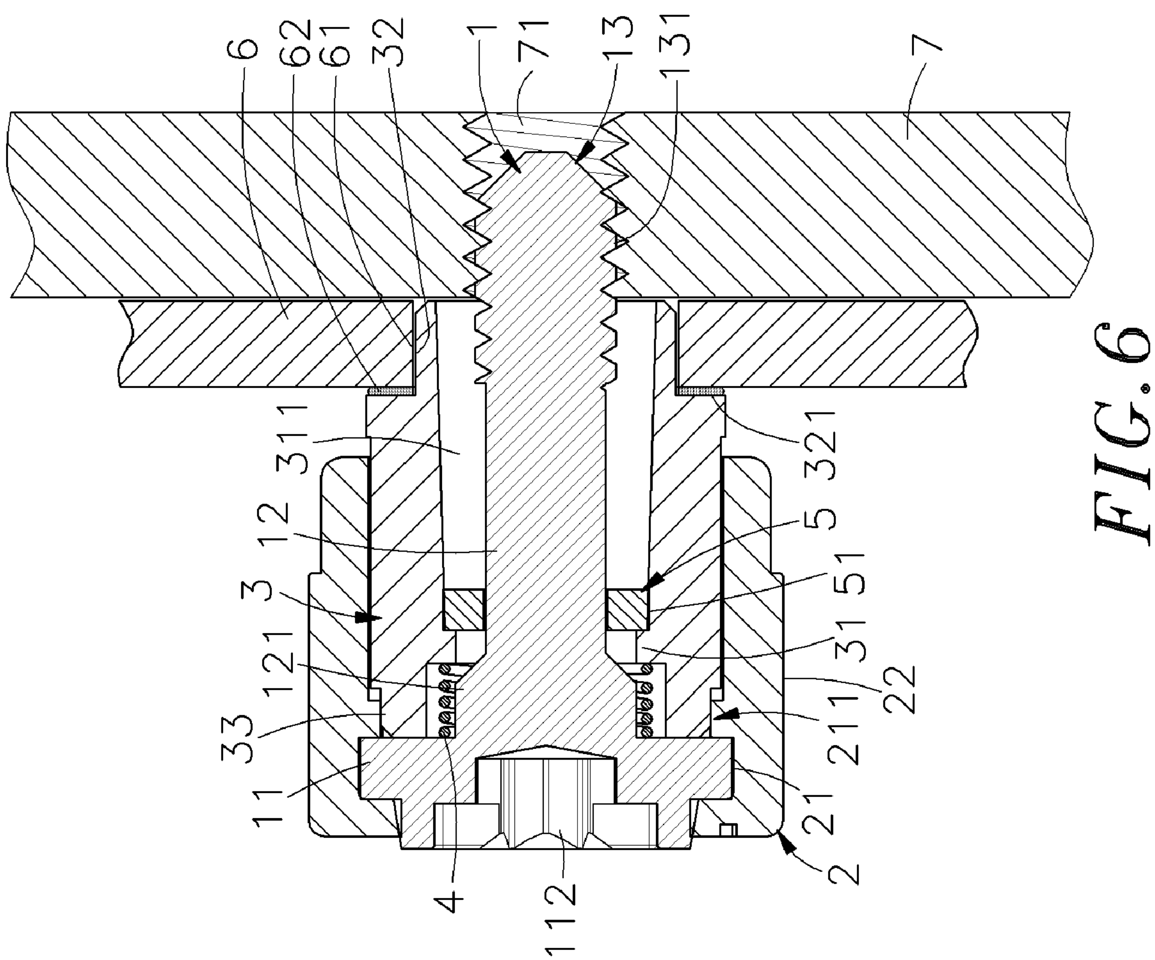
FIG. 6 corresponds to FIG. 5, showing the screw member of the fastener extended out of the socket and fastened to the screw hole of a second metal plate member at the bottom side of the first metal plate member.

Referring to FIGS. 4~6 and FIG. 2 again, after molding of the barrel 2 on the head 11 of the screw 1, the spring member 4 is sleeved onto the shoulder 121 of the screw member 1 and stopped with its one end against the bottom side of the head 11, and then the socket 3 is inserted into the accommodation chamber 20 of the barrel 2 to stop the inside annular step 31 of the socket 3 against the other end of the spring member 4 and to force the tubular top coupling flange 33 of the socket 3 into friction engagement with the interference means 211 of the barrel 2. At this time, the socket 3 is temporarily secured to the inside of the barrel 2, and the connection portion 13 of the screw member 1 is suspending outside the socket 3. Thereafter, the stop ring 5 is forced into the tapered inside wall portion 311 of the socket 3 by an external pressure to move over the connection portion 13 of the screw member 1 and sleeved onto the shank 12 of the screw member 1 inside the socket 3 and stopped between the bottom side of the inside annular flange 31 of the socket 3 and the connection portion 13 of the screw member 1. When the fastener is assembled, the spring member 4 forces the socket 3 outward relative to the screw member 1 to disengage the top coupling flange 33 of the socket 3 from the interference means 211 of the barrel 2. However, because the stop ring 5 is squeezed in between the tapered inside wall portion 311 of the socket 3 and the periphery of the shank 12 of the screw member 1 and stopped between the bottom side of the inside annular flange 31 of the socket 3 and the connection portion 13 of the screw member 1, the socket 3 does not escape from the screw member 1.

During application, the tubular bottom mounting flange 32 of the socket 3 is press-fitted into the mounting through hole 61 of the first metal plate member 6. Alternatively, an automatic installation machine can be used to pick up the fastener and then to insert the tubular bottom mounting flange 32 of the socket 3 of the fastener into the mounting through hole 61 of the first metal plate member 6 and to attach the bottom step 321 of the socket 3 to the solder paste 62 being applied to the border area of the mounting through hole 61 of the first metal plate member 6, and then a reflow soldering process is applied to have the socket 3 be bonded to the first metal plate 6. After installation of the fastener in the first metal plate member 6, pull up the barrel 2 relative to the socket 3 to disengage the interference means 211 from the top coupling flange 33 of the socket 3, and then attach the first metal plate member 6 to the second metal plate member 7 to keep the mounting through hole 61 of the first metal plate member 6 in alignment with the screw hole 71 of the second metal plate member 7, and then force the barrel 2 downwards and rotate the barrel 2 to drive the outer thread 131 of the connection portion 13 of the screw member 1 into the screw hole 71 of the second metal plate member 7, and then a hand tool (for example, screwdriver) is used and attached to the tool groove 112 and rotated to tighten up the connection between the screw member 1 and the second metal plate member 7. Thus, the first metal plate member 6 and the second metal plate member 7 are firmly secured together by the fastener.

When the user wishes to remove the first metal plate member 6 from the second metal plate member 7, rotate the barrel 2 in the reversed direction to disengage the outer thread 131 of the screw member 1 from the screw hole 71 of the second metal plate member 7. After disengagement of the outer thread 131 of the screw member 1 from the screw hole 71 of the second metal plate member 7, the first metal plate member 6 can be directly removed from the second metal plate member 7.

Further, the stop ring 5 is preferably made of a deformable metal material or any metal material having excellent extensibility, such as aluminum or copper. Therefore, the stop ring 5 can be deformed when squeezed. C-shaped retainer, elastic washer or spring washer may be used to substitute for the metal stop ring 5.

Figure 7:
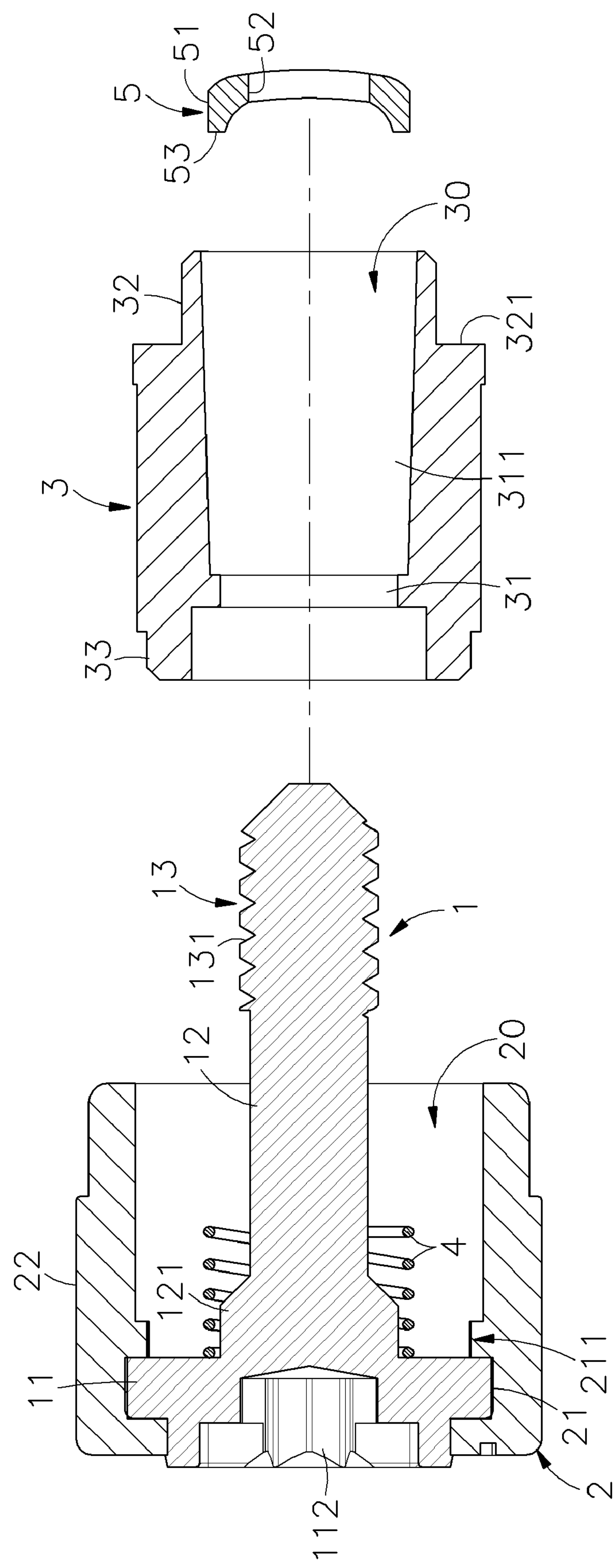
FIG. 7 is an exploded view in section of the present invention, showing an alternate form of the stop ring.

According to an alternate form of the present invention, as shown in FIG. 7, the stop ring 5 is made having a top stop edge 53 protruded from the top side between the inner diameter 52 and the outer diameter 51 for stopping against the inside annular step 31 of the socket 3 so that the stop ring 5 is effectively deformed when squeezed between the inside annular step 31 of the socket 3 and the connection portion 13 of the screw member 1.

Figure 8:
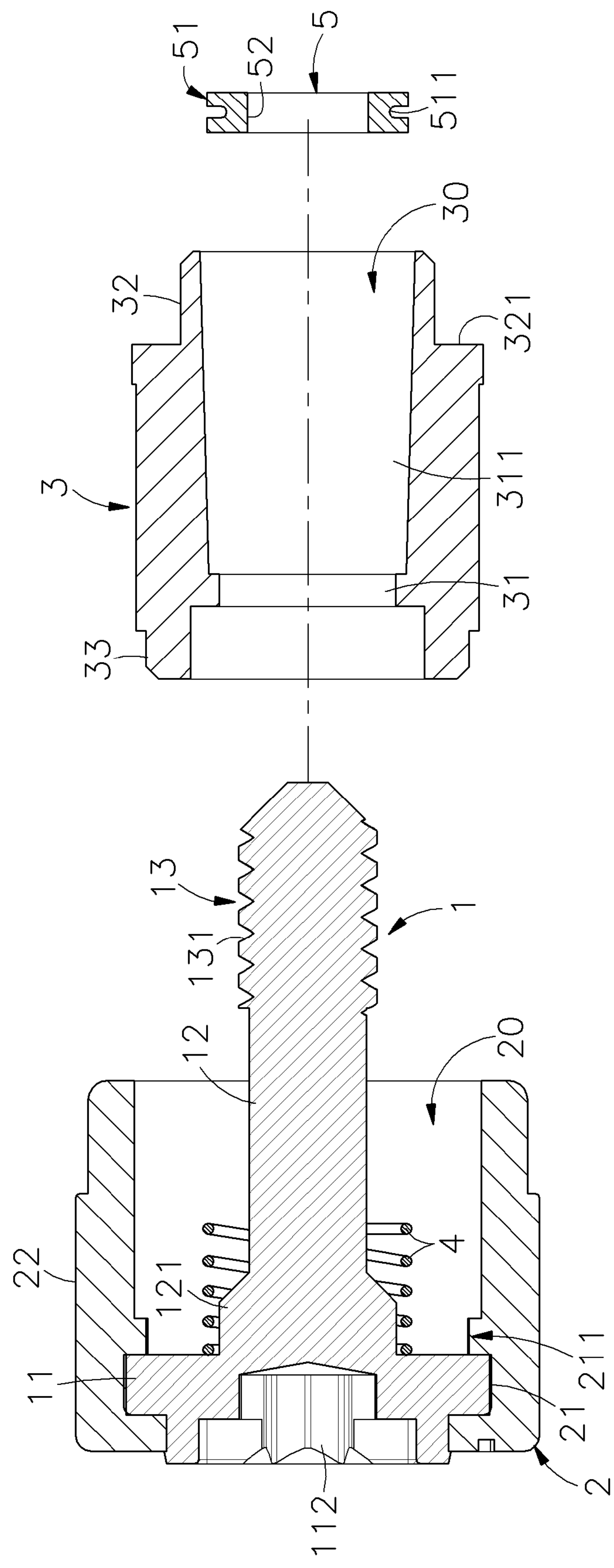
FIG. 8 is an exploded view in section of the present invention, showing another alternate form of the stop ring.

According to another alternate form of the present invention, as shown in FIG. 8, the stop ring 5 is made having a groove 511 extending around the outer diameter 51. The groove 511 can be made having a V-shaped cross section or any of a variety of other configurations. The groove 511 facilitates deformation of the stop ring 5 when the stop ring 5 is squeezed between the inside annular step 31 of the socket 3 and the connection portion 13 of the screw member 1.

A prototype of fastener has been constructed with the features of FIGS. 1~8. The fastener functions smoothly to provide all of the features disclosed earlier.

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. A fastener for joining a first metal plate member and a second metal plate member together, the fastener comprising:

a screw member, said screw member comprising a head, an engagement portion formed on the periphery of said head, and a shank perpendicularly extended from a bottom side of said head and terminating in a connection portion for fastening to a screw hole of said second metal plate member;

a barrel fixedly connected to the engagement portion of said screw member and spaced around said shank, said barrel comprising an accommodation chamber and interference means disposed inside said accommodation chamber, said interference means being stopped at a bottom side of said head of said screw member;

a socket axially movably inserted into the accommodation chamber of said barrel around said shank of said screw member for fastening to a mounting through hole of said first metal plate member, said socket comprising a center opening extending through top and bottom sides thereof for the passing of said shank of said screw member, a tapered inside wall portion surrounding said center opening, an inside annular flange, and a tubular top coupling flange axially extended from the top side for forcing into friction engagement with the interference means of said barrel;

a spring member sleeved onto said shank of said screw member and stopped between the head of said screw member and the inside annular flange of said socket; and a stop ring sleeved onto said shank of said screw member and stoppable between the inside annular flange of said socket and the connection portion of said screw member, said stop ring having an outer diameter thereof forced into friction engagement with said tapered inside wall portion of said socket.

2. The fastener as claimed in claim 1, wherein said screw member is a metal screw member, and said barrel is a plastic barrel directly molded from a heat-resistance plastic material on the head of said screw member with over-molding technology.

3. The fastener as claimed in claim 1, wherein said screw member further comprises an outer thread extending around the periphery of said connection portion, and a tool groove located on a top side of said head opposite to said shank.

4. The fastener as claimed in claim 1, wherein said interference means of said barrel comprises a plurality of raised portions protruded from an inside wall of said barrel that defines said accommodation chamber.

5. The fastener as claimed in claim 1, wherein said interference means of said barrel comprises an annular flange protruded from an inside wall of said barrel that defines said accommodation chamber.

6. The fastener as claimed in claim 1, wherein said barrel comprises a retaining groove extending around an inside wall thereof and engaged with the engagement portion of said screw member.

7. The fastener as claimed in claim 1, wherein said stop ring comprises a top stop edge protruded from a top side thereof for stopping against the inside annular flange of said socket.

8. The fastener as claimed in claim 1, wherein said socket comprises a tubular bottom mounting flange axially extended from the bottom side thereof and fitted into the mounting through hole of said first metal plate member.

9. The fastener as claimed in claim 8, wherein said socket comprises a bottom step defined between the bottom side thereof and said tubular bottom mounting flange for bonding to a top side of said first metal plate member opposite to said second metal plate member with a solder paste.

10. The fastener as claimed in claim 1, wherein said stop ring comprises a groove extending around the periphery thereof.

* * * * *